United States Patent
Kizumoto

(10) Patent No.: US 10,731,060 B2
(45) Date of Patent: Aug. 4, 2020

(54) ADHESIVE COMPOSITION FOR BASE WITH LOW-ENERGY SURFACE

(71) Applicant: TOYOBO CO., LTD., Osaka (JP)

(72) Inventor: Hirotoshi Kizumoto, Hyogo (JP)

(73) Assignee: TOYOBO CO., LTD., Osaka (JP)

(*) Notice: Subject to any disclaimer, the term of this patent is extended or adjusted under 35 U.S.C. 154(b) by 29 days.

(21) Appl. No.: 16/076,759

(22) PCT Filed: Jan. 31, 2017

(86) PCT No.: PCT/JP2017/003304
§ 371 (c)(1),
(2) Date: Aug. 9, 2018

(87) PCT Pub. No.: WO2017/138399
PCT Pub. Date: Aug. 17, 2017

(65) Prior Publication Data
US 2019/0048235 A1    Feb. 14, 2019

(30) Foreign Application Priority Data

Feb. 12, 2016  (JP) ................. 2016-024720

(51) Int. Cl.
*C09J 123/08* (2006.01)
*C09J 123/26* (2006.01)
*C09J 11/06* (2006.01)
*C09J 11/08* (2006.01)

(52) U.S. Cl.
CPC ............ *C09J 123/26* (2013.01); *C09J 11/06* (2013.01); *C09J 11/08* (2013.01); *C09J 123/08* (2013.01); *C09J 123/0869* (2013.01); *C08L 2201/56* (2013.01)

(58) Field of Classification Search
None
See application file for complete search history.

(56) References Cited

U.S. PATENT DOCUMENTS

| | | | |
|---|---|---|---|
| 4,460,728 A * | 7/1984 | Schmidt, Jr. | ........... C09J 123/08 524/271 |
| 4,816,306 A * | 3/1989 | Brady | ................... C09J 123/08 428/36.92 |
| 7,846,494 B1 | 12/2010 | Patel et al. | |
| 2009/0041992 A1 | 2/2009 | Umeda et al. | |
| 2013/0338284 A1 | 12/2013 | Ito et al. | |
| 2014/0296394 A1 | 10/2014 | Ishida et al. | |
| 2015/0322306 A1 | 11/2015 | Masuko et al. | |

FOREIGN PATENT DOCUMENTS

| | | |
|---|---|---|
| CN | 101838362 | 9/2010 |
| CN | 104411794 | 3/2015 |
| CN | 104837947 | 8/2015 |
| EP | 1 901 261 | 3/2008 |
| EP | 2 660 296 | 11/2013 |
| JP | 51-47029 | 4/1976 |
| JP | 61-163980 | 7/1986 |
| JP | 62-62876 | 3/1987 |
| JP | 63-17945 | 1/1988 |
| JP | 3-149256 | 6/1991 |
| JP | 5-97937 | 4/1993 |
| JP | 11-256095 | 9/1999 |
| JP | 2012-197388 | 10/2012 |
| JP | 2013-95873 | 5/2013 |
| WO | 2004/041954 | 5/2004 |
| WO | 2004/046214 | 6/2004 |
| WO | 2005/108442 | 11/2005 |
| WO | 2014/046834 | 3/2014 |

OTHER PUBLICATIONS

DuPont Elvax Product Information (2013) pp. 1-5. (Year: 2013).*
International Search Report dated Feb. 28, 2017 in International (PCT) Application No. PCT/JP2017/003304.
Haraga , "Current Status of Adhesion Technology and Outline of Highly Reliable Bonding", Journal of the Japan Society of Colour Mater, 2014, vol. 87, No. 4, pp. 139-144, with partial translation.
Extended European Search Report dated Jul. 11, 2019 in corresponding European Patent Application No. 17750124.4.
Office Action dated Apr. 15, 2020 in corresponding Chinese Patent Application No. 201780011053.5, with Machine translation.
Zidong, et al., "Practical Adhesive Raw Material Manual", Beijing National Defense Industry Press, Jul. 1999, with English translation.

* cited by examiner

Primary Examiner — David J Buttner

(74) Attorney, Agent, or Firm — Wenderoth, Lind & Ponack, L.L.P.

(57) ABSTRACT

The present invention provides a stable organic solvent solution-type adhesive composition that is in a solution state even at low temperatures and that has excellent adhesion to polyolefin base materials, in particular polyethylene substrates (both LDPE and HDPE). The invention provides an adhesive resin composition comprising a modified polyethylene copolymer (component A) having a melting point of less than 80° C., a terpene-based tackifier (component B), and an organic solvent (component C), wherein component B is contained in an amount of 30 to 100 parts by weight, per 100 parts by weight of component A.

12 Claims, No Drawings

ADHESIVE COMPOSITION FOR BASE WITH LOW-ENERGY SURFACE

TECHNICAL FIELD

The present invention relates to an organic solvent solution-type primer or adhesive composition that shows excellent adhesion to low energy surface substrates typified by polyolefin, in particular polyethylene substrates.

BACKGROUND ART

Techniques for bonding with substrates that have low surface energy, such as polyethylene and polypropylene, have long been studied. It has been known to be not easy to design an adhesive that shows high adhesion to these materials. A proposed technique of achieving excellent adhesion to these low surface energy substrates comprises subjecting an adherend surface to pretreatment, such as corona discharge treatment or plasma treatment, to thus increase the surface energy in advance, followed by bonding. Although these techniques are effective, expensive devices are required, as well as increased power consumption.

In contrast, products comprising olefin-based materials, such as polyethylene or polypropylene, have recently continued to increase in a variety of ways, ranging from common household appliances to those for various industrial applications. Under such circumstances, more effective adhesives that were not previously available have also recently been increasingly developed. This fact is also disclosed in Non-patent Literature (NPL) 1, on page 139 in the section entitled "2.1 State of Adhesion Techniques." Patent Literature (PTL) 1, PTL 2, PTL 3, PTL 4, and PTL 5 disclose specific examples.

CITATION LIST

Patent Literature

PTL 1: JP2012-197388A
PTL 2: JP2013-95873A
PTL 3: WO 2004/041954
PTL 4: JPH05-97937A
PTL 5: JPH11-256095A

Non-Patent Literature

NPL 1: J. Jpn. Soc. Colour Mater., 87 [4], 139-144 (2014)

SUMMARY OF INVENTION

Technical Problem

In general, products comprising olefin-based materials usually have high versatility and are inexpensive. Therefore, inexpensive and highly versatile members are also required as adhesives and coating agents for use with these products. In this sense, the adhesive resins disclosed in PTL 1, PTL 2, and NPL 1 are not sufficient, at present, to consider as having high versatility. In contrast, PTL 3, PTL 4, and PTL 5 propose highly versatile resins comprising as a base resin SEBS-based elastomers or propylene-butene-ethylene copolymers modified by acid addition; however, these resins do not have sufficient adhesion to polyethylene substrates.

In view of such problems to be solved, an object of the present invention is to provide an adhesive composition with excellent adhesion to various olefin substrates, in particular polyethylene substrates, and also having excellent storage stability at low temperatures (20° C. and 15° C.).

Solution to Problem

To achieve the above object, the present inventor conducted extensive research to thus propose the following invention.

More specifically, the present invention provides an adhesive composition comprising:
a modified polyethylene copolymer (component A) having a melting point of less than 80° C.;
a terpene-based tackifier (component B); and
an organic solvent (component C),
wherein component B is contained in an amount of 30 to 100 parts by weight, per 100 parts by weight of component A.

The terpene-based tackifier (component B) is preferably a phenol-modified terpene phenol resin.

The organic solvent (component C) is preferably an alicyclic hydrocarbon compound and/or an aromatic hydrocarbon compound, and the total weight percentage of component A and component B is preferably 20 wt % or less, based on the total weight of component A, component B, and component C.

It is further preferable to incorporate a polypropylene-based resin (component D) in an amount within a range of less than 15 parts by weight, per 100 parts by weight of component A.

Advantageous Effects of Invention

The adhesive composition according to the present invention comprises a resin having a polyethylene backbone (a modified polyethylene copolymer: component A) as a principal component, and further comprises a specific tackifier (component B) at a predetermined proportion, whereby the adhesive composition according to the present invention exerts well-balanced excellent adhesion to a wide range of polyethylene substrates, ranging from low density polyethylene (LDPE) substrates to high density polyethylene (HDPE) substrates. Additionally, component A has a melting point of less than 80° C., and component B is contained in a predetermined amount, whereby the organic solvent solution is stable at low temperatures (20° C. and 15° C.).

SUMMARY OF INVENTION

Embodiments according to the present invention are described below.
Modified Polyethylene Copolymer (Component A)

The modified polyethylene copolymer (hereinafter sometimes simply referred to as "component A") used in the present invention is preferably an ethylene-α-olefin copolymer or a copolymer of ethylene with at least one member selected from the group consisting of acrylic acid, acrylic acid alkyl esters, α,β-unsaturated carboxylic acids, and acid anhydrides thereof.

The ethylene-α-olefin copolymer as used herein mainly comprises ethylene that is copolymerized with an α-olefin. Examples of α-olefins include propylene, 1-butene, 1-pentene, 1-hexene, 1-heptene, 1-octene, 4-methyl-1-pentene, which can be used singly or in a combination of two or more. Preferred among these α-olefins are propylene and 1-hexene. The ratio of the ethylene component to the α-olefin component in the ethylene-α-olefin copolymer is not limited; the ethylene component is preferably 50 mol % or more, and more preferably more than 50 mol %.

Although the method for producing the ethylene-α-olefin copolymer is not particularly limited, an ethylene-α-olefin copolymer obtained by polymerization using a metallocene-based catalyst is preferable since it has a uniform crystalline structure and excellent solubility in organic solvents.

The acrylic acid alkyl ester may have various alkyl chains. In terms of versatility, it is preferable to use acrylic acid methyl ester. The amount of acrylic acid used for copolymerization is preferably 0.1 wt % or more, and more preferably 1 wt % or more. Further, the amount is preferably 5 wt % or less, and more preferably 3 wt % or less. If the amount is less than 0.1 wt %, the compatibility with component B may decrease, and if the amount exceeds 5 wt %, the adhesion to a polyethylene substrate may become insufficient. The amount of acrylic acid alkyl ester used for copolymerization is preferably 10 wt % or more, and more preferably 20 wt % or more. Further, the amount is preferably 40 wt % or less, and more preferably 30 wt % or less.

Examples of the α,β-unsaturated carboxylic acids and acid anhydrides thereof include, but are not particularly limited to, maleic acid, itaconic acid, citraconic acid, and acid anhydrides thereof. Of these, an acid anhydride is preferable, maleic anhydride and itaconic anhydride are more preferable, and maleic anhydride is still more preferable. The amount of these acid components used for copolymerization is preferably 0.1 wt % or more, and more preferably 1 wt % or more. Further, the amount is preferably 5 wt % or less, and more preferably 3 wt % or less. If the amount is less than 0.1 wt %, the compatibility with component B may decrease, and if the amount exceeds 5 wt %, the adhesion to a polyethylene substrate may become insufficient.

As component A of the adhesive composition according to the present invention, these modified polyethylene copolymers may be used alone or in a combination of two or more. These modified polyethylene copolymers must have a melting point of less than 80° C., preferably less than 70° C., and more preferably less than 60° C. If the melting point is 80° C. or higher, the stability of the organic solvent solution at low temperatures may become very poor. The lower limit is not particularly limited. The lower limit is preferably 30° C. or higher, and more preferably 40° C. or higher. If the lower limit is less than 30° C., the cohesive force of the resin is overly decreased, and sufficient adhesive strength may not be obtained.

Examples of commercially available products of these modified polyethylene copolymers include the series of "Kernel (registered trademark)" of Japan Polyethylene Corporation, as an ethylene-α-olefin copolymer obtained by polymerization using a metallocene catalyst. The series of this grade includes, for example, KS240T (melting point: 60° C.), KS340T (melting point: 60° C.), and KJ640T (melting point: 58° C.), which have a melting point of less than 80° C., and of these, "KJ640T" with the lowest melting point is most preferable since it achieves excellent stability of the organic solvent solution at low temperatures.

Other examples include "Rexpearl (registered trademark) ET" as an ethylene-acrylic acid methyl ester-maleic anhydride copolymer, and "Rexpearl (registered trademark) EMA" as an ethylene-methyl acrylate copolymer, both of which being produced by the same company, Japan Polyethylene Corporation. As those with a melting point of less than 80° C., the series includes "ET350X" (melting point: 73° C.), "EB050S" (melting point: 73° C.), "EB240H" (melting point: 77° C.), "EB140F" (melting point: 77° C.), and "EB440H" (melting point: 77° C.). Of these, "ET350X" and "EB050S," which have a lower melting point, are more preferable.

In relation to the molecular weight, component A of the present invention preferably has a melt flow rate (MFR) value of 0.1 g/10 minutes or more, more preferably 1 g/10 minutes or more, still more preferably 1.5 g/10 minutes or more, and particularly preferably 2 g/10 minutes or more. Further, the MFR value is preferably 100 g/10 minutes or less, more preferably 50 g/10 minutes or less, still more preferably 40 g/10 minutes or less, and particularly preferably 30 g/10 minutes or less. If the MFR value exceeds 100 g/10 minutes, the resin will have a decreased cohesive force, which may result in insufficient adhesive strength.

Tackifier (Component B)

The tackifier (hereinafter sometimes simply referred to as "component B") used in the present invention must have high compatibility with the modified polyethylene copolymer (component A). If the compatibility is poor, the feature of the adhesive composition of the present invention, i.e., excellent stability of the organic solvent solution at low temperatures, may not be achieved. Further, the adhesion to, in particular, a high density polyethylene (or HDPE) substrate, from among various polyethylene substrates, may not be obtained. The HDPE substrate as used herein refers to a polyethylene resin substrate with a density of 0.94 g/cm$^3$ or more, and particularly refers to a polyethylene substrate with a density of about 0.95 g/cm$^3$.

The SP value of a tackifier serves as a rough index to determine the compatibility. A tackifier having excellent compatibility with the modified polyethylene copolymer (component A) has an SP value of preferably 8.60 to 8.90 (J/cm$^3$)$^{1/2}$, as calculated by the Hoy's method. The SP value (δ) of a polymer compound, such as a tackifier, as calculated by the Hoy's method is known to be obtained using the following formula.

$$\delta(\text{polymer compound}) = \rho \Sigma E/M$$

In the formula, ρ represents the density of a polymer compound, M represents the molecular weight of the repeating structural unit of the polymer compound, and E represents the molar cohesive energy constant of each structural unit constituting the polymer compound. For the numerical value E, values published in various documents can be used. Examples of the documents that disclose the value include J. Paint Technology vol. 42 76-118 (1970).

A method of actually confirming the compatibility uses a dry coating film produced by mixing a modified polyethylene copolymer and a tackifier; the higher the transparency of the film, the higher the compatibility is. Although the transparency can be confirmed visually, the use of a haze meter etc. (preferably 1.0 or less, and more preferably 0.5 or less) can provide more accurate results. An alternative method comprises measuring the dynamic viscoelastic properties of the dry film produced as above; if the main dispersion peak of loss modulus (E") is not broader than that before the tackifier is incorporated, the compatibility is considered to be excellent.

The tackifier has a softening point of preferably 60° C. or higher, more preferably 70° C. or higher, and still more preferably 80° C. or higher. Further, the softening point is preferably 160° C. or lower, and more preferably 150° C. or lower. The number average molecular weight is preferably 500 or more, more preferably 700 or more, and still more preferably 800 or more. Further, the number average molecular weight is preferably 1800 or less, more preferably 1600 or less, and still more preferably 1500 or less. If the number average molecular weight is less than 500, the physical properties of the coating of the modified polyethylene copolymer (component A) resin may be deteriorated, or bleeding out may occur on the coating film surface. If the number average molecular weight exceeds 1800, the compatibility with the modified polyethylene copolymer (component A) resin may become insufficient.

The tackifier used in the present invention must be a terpene-based resin, and more preferably a terpene phenol resin. Examples of commercially available products of hydrogenated terpene-based resins include the Clearon (registered trademark) series of Yasuhara Chemical Co., Ltd. Specific examples of commercially available products of terpene phenol resins include the YS Polyster (registered trademark) series of Yasuhara Chemical Co., Ltd. For example, the SP values of "YS Polyster T160," "YS Polyster T145," "YS Polyster T130," "YS Polyster T115," "YS Polyster T100," and "YS Polyster T80" are all 8.81 $(J/cm^3)^{1/2}$, while the SP values of "YS Polyster U130" and "YS Polyster U115" are both 8.69 $(J/cm^3)^{1/2}$.

The tackifier must be used in an amount of 10 parts by weight or more and 100 parts by weight or less, preferably 20 parts by weight or more and 80 parts by weight or less, more preferably 30 parts by weight or more and 70 parts by weight or less, and still more preferably 40 parts by weight or more and 60 parts by weight or less, per 100 parts by weight of the modified polyethylene copolymer (component A). If the amount is less than 10 parts by weight, the effects achieved with the use of a tackifier, i.e., the adhesion to a HDPE substrate and solution stability at low temperatures, may not be achieved, and if the amount exceeds 100 parts by weight, the physical properties of the adhesive layer may become poor.

Organic Solvent (Component C)

For the organic solvent (hereinafter sometimes simply referred to as "component C") used in the adhesive composition of the present invention, aromatic hydrocarbons, such as toluene and xylenes, and alicyclic hydrocarbons, such as cyclohexane and methylcyclohexane, may be used individually or in a combination of two or more, as the primary solvent. Further, n-butyl acetate, ethyl acetate, 1-butanol, 2-butanol, methyl ethyl ketone, methyl isobutyl ketone, and the like may be used in an amount of less than 20 wt %, based on the entire organic solvents, by mixing with the primary solvent.

The total weight percentage of component A and component B is preferably 20 wt % or less, and more preferably 15 wt % or less, based on the total weight of component A, component B, and component C. When a polypropylene-based resin (component D) described later is further incorporated, the total weight percentage of component A, component B, and component D is preferably 20 wt % or less, and more preferably 15 wt % or less, based on the total weight of component A, component B, component C, and component D. If the total weight percentage exceeds 20 wt %, the stability of the organic solvent solution at low temperatures may be significantly deteriorated.

Polypropylene-Based Resin (Component D)

To further improve the solubility in an organic solvent, the adhesive composition according to the present invention may further comprise a polypropylene-based resin (hereinafter sometimes simply referred to as "component D"). Examples of the polypropylene-based resin (component D) include non-crystalline polypropylene resins and chlorinated modified polypropylene copolymers. The chlorinated modified polypropylene copolymers are preferably obtained by adding chlorine atoms to the polypropylene side chains or propylene-α-olefin copolymer side chains. The propylene-α-olefin copolymer as used herein mainly comprises propylene that is copolymerized with an α-olefin. Examples of α-olefin include ethylene, 1-butene, 1-heptene, 1-octene, 4-methyl-1-pentene, which can be used singly or in a combination of two or more. Preferred among these is 1-butene. The ratio of the propylene component to the α-olefin component in the propylene-α-olefin copolymer is not limited; the propylene component is preferably 50 mol % or higher, and more preferably higher than 50 mol %. Specific examples of commercially available chlorinated modified polypropylene copolymers include Hardlen (registered trademark) DX series (e.g., "DX-526P" and "DX-530P") of Toyobo Co., Ltd. Examples of non-crystalline polypropylene resins include L-Modu (registered trademark) of Idemitsu Kosan Co., Ltd. (e.g., "L-Modu S400," "L-Modu S600," and "L-Modu S901"), and the like.

The non-crystalline polypropylene resins do not show clear melting peaks when the temperature is increased from −50° C. to 200° C. at a rate of 10° C./min using a differential scanning calorimeter (DSC).

The chlorinated modified polypropylene copolymer has a chlorine content of preferably 5 wt % or more, more preferably 8 wt % or more, and still more preferably 10 wt % or more. Further, the chlorine content is preferably 40 wt % or less, more preferably 35 wt % or less, and still more preferably 30 wt % or less. When the chlorine content is within the above ranges, excellent organic solvent solubility is achieved.

The chlorinated modified polypropylene copolymer has a weight average molecular weight (Mw) within a range of preferably 40,000 to 170,000, more preferably 60,000 to 150,000, and still more preferably 80,000 to 130,000.

The production method for the chlorinated modified polypropylene copolymer is not particularly limited; for example, the chlorinated modified polypropylene copolymer may be obtained by dissolving polypropylene in a halogenated hydrocarbon, such as chloroform, and introducing chlorine.

The production method for component D above is not particularly limited; however, a propylene-α-olefin copolymer obtained by polymerization using a metallocene-based catalyst is preferable since it has a uniform crystalline structure and excellent solubility in a solvent.

The amount of component D above is preferably less than 15 parts by weight, more preferably 13 parts by weight or less, and still more preferably 11 parts by weight or less, per 100 parts by weight of component A. If component D is overly used, the adhesion to polyethylene substrates may be deteriorated.

Adhesive Composition

The adhesive composition according to the present invention comprises a modified polyethylene copolymer (component A) having a melting point of less than 80° C., a terpene-based tackifier (component B), and an organic solvent (component C), wherein component B is contained in an amount of 30 to 100 parts by weight, per 100 parts by weight of component A. The adhesive composition according to the present invention optionally comprises a polypropylene-based resin (component D) in an amount of less than 15 parts by weight, per 100 parts by weight of component A.

The adhesive composition according to the present invention may optionally comprise a curing agent. Examples of the curing agent include, but are not particularly limited to, multifunctional isocyanate compounds. Specific examples include aliphatic diisocyanate compounds or alicyclic diisocyanate compounds, such as hexamethylene diisocyanate, isophorone diisocyanate, and 4,4'-dicyclohexylmethane diisocyanate, and the addition polymer compounds thereof. Examples also include aromatic diisocyanate compounds, such as tolylene diisocyanate and 4,4'-diphenylmethane diisocyanate, and the addition polymer compounds thereof. It is also possible to incorporate various tertiary amine compounds and organic tin compounds, as the reaction catalyst of these multifunctional isocyanate compounds.

It is also possible to incorporate other curing agents such as various multifunctional aliphatic epoxy compounds, multifunctional alicyclic epoxy compounds, and multifunctional aromatic epoxy compounds. At this time, triphenylphosphine and various multifunctional amine compounds may be added as a hardening accelerator.

In addition to the above, the adhesive composition according to the present invention may further comprise various additives, such as a filler, a pigment, a colorant, and an antioxidant, as long as the adhesion is not deteriorated.

The adhesive composition according to the present invention is preferably substantially free from a rubber component. The term "substantially free from" means that the adhesive composition contains a rubber component in an amount of preferably 3 wt % or less, more preferably 1 wt % or less, still more preferably 0.1 wt % or less, and particularly preferably 0 wt % or less.

The adhesive composition obtained in the present invention has excellent adhesion to a polyolefin-based resin substrate, in particular a polyethylene resin substrate, and is thus useful for the application of a primer, a coating composition, an ink, a coating agent, and an adhesive for painting, printing, gluing, or coating.

The polyolefin-based resin substrate may be suitably selected from previously known polyolefin resins. For example, polyethylene, polypropylene, ethylene-propylene copolymers, and the like may be used without limitation. The polyolefin-based resin substrate may contain a pigment and various additives, if necessary.

EXAMPLES

The present invention is specifically described below with reference to Examples. However, the scope of the present invention is not limited to the following Examples. In the Examples and Comparative Examples, when the term "portion" is simply referred to, the term represents parts by weight. The following are the measurement and evaluation methods used in the present invention.

1) Measurement of Solids Concentration of Adhesive Composition

A sample (adhesive composition) (about 1 g) is weighed in an aluminum cup having a diameter of 5 cm and a height of 1 cm. Subsequently, the aluminum cup containing the sample is dried in a vacuum dryer at 60° C. for 6 hours. The aluminum cup removed from the vacuum dryer is placed in a desiccator, and left to stand for cooling at room temperature for 30 minutes. The aluminum cup is removed from the desiccator to be weighed, and the solids concentration (wt %) of the sample (adhesive composition) is calculated from the weight change before and after the vacuum drying (the following formula).

Solids concentration of adhesive composition (wt %)=[(sample weight before vacuum drying)−(sample weight after vacuum drying)]/(sample weight before vacuum drying)×100

2) Qualitative Analysis of Composition Weight Ratio (Tackifier Content)

The dried sample (resin) obtained through the measurement of the solids concentration above was dissolved in deuterochloroform, and the ratio of the modified polyethylene copolymer, tackifier, and polypropylene-based resin was determined by $^1$H-NMR analysis, using a nuclear magnetic resonance (NMR) analyzer "Gemini 400-MR" produced by Varian Medical Systems.

3) Measurement of Viscosity of Adhesive Composition

The adhesive compositions obtained in the Examples and Comparative Examples were each placed in a 50-cc glass sample tube provided with an airtight stopper, and maintained in a constant-temperature water tank at 25° C. for 12 hours. Subsequently, 0.6 g of the sample was subjected to measurement using a "Viscometer TV-22" (E-type viscometer) produced by Toki Sangyo Co., Ltd., under the following conditions: rotor: No. 0.8° (=48')×R24, range: H, rotation number: 5 rpm, and temperature: 25° C.

4) Measurement of the Melting Point of the Modified Polyethylene Copolymer by DSC About 5 mg of the modified polyethylene copolymer sample was weighed in a hermetically sealable aluminum pan, and a warming and cooling cycle of −50° C.→200° C.→−50° C. at a rate of 10° C./min was repeated twice, using a DSC Q2000 produced by TA Instruments Japan Inc. The minimum point temperature of the endothermic peak that appeared when the temperature was increased the second time was read as the melting point.

5) Evaluation of Storage Stability of Adhesive Composition

The adhesive compositions prepared in the Examples and Comparative Examples were stored while being left to stand in an incubator (20° C. or 15° C.). The change in appearance of the solutions after being left to stand for 24 hours was observed, and the results were evaluated based on the following criteria.

A: the adhesive composition maintained the flowability equivalent to that at the time when it was prepared.
B: the viscosity of the adhesive composition increased, but the flowability was maintained.
C: the adhesive composition was solidified, and had no flowability.

6) Evaluation 1 of Adhesion to Polyethylene Substrate (Cross-Cut Peel Test)

The adhesive compositions obtained in the Examples and Comparative Examples were each applied to a high density polyethylene (HDPE) test piece (thickness: 2 m, size: 25 mm×100 mm, density: 0.95 g/cm$^3$) produced by Paltek corporation or a low density polyethylene (LDPE) test piece of the same size (density: 0.92 g/cm$^3$) produced by the same company, using a wire bar (#16E) such that the film thickness after drying became 10 μm, and dried in a hot air dryer at 90° C. for 10 minutes. After the test pieces removed from the dryer were left to stand at room temperature for 1 hour, a grid of 100 squares was formed at 1-nm intervals on the coating surface using a cutter knife, adhesive cellophane tape was applied to the surface of the grid portion, and the tape was peeled off (cross-cut peel test). The number of squares peeled off was counted, and the results were shown as 0/100 when all of the squares were peeled off, and 100/100 when none of the squares were peeled off. Table 2 shows the results.

7) Evaluation 2 of Adhesion to LDPE Polyethylene Substrate (Film 90° Peel Test)

The adhesive compositions obtained in the Examples and Comparative Examples were each applied to an LDPE film having a thickness of 40 μm (density: 0.92 g/cm$^3$) produced by Nakagawa Seitaikako Co., Ltd. using a wire bar (#16E) such that the film thickness after drying became 10 μm, and dried in a hot air dryer at 90° C. for 10 minutes. After drying, the film was cut into 10 strip shaped pieces (2.5 cm×10 cm), and the coating surfaces were bonded to each other, followed by heat-sealing at 90° C. at a pressure of 3 kgf/cm² for 30 seconds to produce 5 specimens on which a heat-sealed layer with a width of 1 cm was formed. The end of the specimen was clamped between chucks of a tensile tester ("RTM-100" produced by Orientec) and pulled in the vertical direction using a load cell of 5 kgf at a pulling speed of 50 mm/min at 25° C. in air; in this manner, a 90° peel test was performed. Table 2 shows the average value calculated using the obtained five values of peel strength.

Example 1

The following starting materials were placed in a 1-L glass flask equipped with a thermometer, a condenser, and a stirring rod, and stirred at 80° C. for 1 hour to homogeneously dissolve the resin content, thus preparing an adhesive composition.
Kernel (registered trademark) KJ640T
(a modified polyethylene copolymer produced by Japan Polyethylene Corporation): 100 parts
YS Polyster (registered trademark) T130
(a terpene phenol-based tackifier produced by Yasuhara Chemical Co., Ltd.): 50 parts
MCH (methylcyclohexane): 850 parts After cooling, the solution was collected to obtain the adhesive composition. The solids concentration and the amounts of the modified polyethylene copolymer resin and the tackifier were measured, and based on these results, the weight ratio of each component above was determined. Table 1 shows the results, together with the measurement values of the melting points of the modified polyethylene copolymers. Additionally, in accordance with the evaluation and measurement methods described above, the solution viscosity at 25° C. and the solution (adhesive composition) storage stability at 20° C. or 15° C. were measured, and the cross-cut peel test with respect to the HDPE and LDPE films, and the 90° peel test with respect to the LDPE film were performed. Table 2 shows the evaluation results.

Example 2

The following starting materials were placed in a 1-L glass flask equipped with a thermometer, a condenser, and a stirring rod, and stirred at 80° C. for 1 hour to homogeneously dissolve the resin content, thus preparing an adhesive composition.
Rexpearl ET350X
(a modified polyethylene copolymer produced by Japan Polyethylene Corporation): 100 parts
YS Polyster T130
(a terpene phenol-based tackifier produced by Yasuhara Chemical Co., Ltd.): 70 parts
Toluene: 963 parts After cooling, the solution was collected, and the solution characteristics of the obtained adhesive composition, and the adhesion of the obtained adhesive composition to a polyethylene substrate were measured as in Example 1. Tables 1 and 2 show the results.

Example 3

The following starting materials were placed in a 2-L glass flask equipped with a thermometer, a condenser, and a stirring rod, and stirred at 80° C. for 1 hour to homogeneously dissolve the resin content, thus preparing an adhesive composition.
Kernel KJ640T
(a modified polyethylene copolymer produced by Japan Polyethylene Corporation): 100 parts
YS Polyster U130
(a terpene phenol-based tackifier produced by Yasuhara Chemical Co., Ltd.): 40 parts
MCH (methylcyclohexane): 793 parts After cooling, the solution was collected, and the solution characteristics of the obtained adhesive composition, and the adhesion of the obtained adhesive composition to a polyethylene substrate were measured as in Example 1. Tables 1 and 2 show the results.

Example 4

The following starting materials were placed in a 2-L glass flask equipped with a thermometer, a condenser, and a stirring rod, and stirred at 80° C. for 1 hour to homogeneously dissolve the resin content, thus preparing an adhesive composition.
Kernel KJ640T
(a modified polyethylene copolymer produced by Japan Polyethylene Corporation): 90 parts
Hardlen DX-526P (chlorine content: 26 wt %)
(a chlorinated modified polypropylene copolymer produced by Toyobo Co., Ltd.): 10 parts
YS Polyster T130
(a terpene phenol-based tackifier produced by Yasuhara Chemical Co., Ltd.): 50 parts
CH (cyclohexane): 765 parts
Ethyl acetate: 85 parts After cooling, the solution was collected, and the solution characteristics of the obtained adhesive composition, and the adhesion of the obtained adhesive composition to a polyethylene substrate were measured as in Example 1. Tables 1 and 2 show the results.

Example 5

The following starting materials were placed in a 2-L glass flask equipped with a thermometer, a condenser, and a stirring rod, and stirred at 80° C. for 1 hour to homogeneously dissolve the resin content, thus preparing an adhesive composition.
Kernel KJ640T
(a modified polyethylene copolymer produced by Japan Polyethylene Corporation): 90 parts
L-Modu 5400
(a polypropylene resin produced by Idemitsu Kosan Co., Ltd.): 10 parts
YS Polyster T130
(a terpene phenol-based tackifier produced by Yasuhara Chemical Co., Ltd.): 50 parts
CH (cyclohexane): 765 parts
Ethyl acetate: 85 parts After cooling, the solution was collected, and the solution characteristics of the obtained adhesive composition, and the adhesion of the obtained adhesive composition to a polyethylene substrate were measured as in Example 1. Tables 1 and 2 show the results.

Example 6

The following starting materials were placed in a 2-L glass flask equipped with a thermometer, a condenser, and a stirring rod, and stirred at 80° C. for 1 hour to homogeneously dissolve the resin content, thus preparing an adhesive composition.

Kernel KJ640T
(a modified polyethylene copolymer produced by Japan Polyethylene Corporation): 100 parts
Hardlen DX-526P (chlorine content: 26 wt %)
(a chlorinated modified polypropylene copolymer produced by Toyobo Co., Ltd.): 10 parts
Clearon K100
(a hydrogenated terpene-based tackifier produced by Yasuhara Chemical Co., Ltd.): 50 parts
CH (cyclohexane): 765 parts
Butyl acetate: 85 parts After cooling, the solution was collected, and the solution characteristics of the obtained adhesive composition, and the adhesion of the obtained adhesive composition to a polyethylene substrate were measured as in Example 1. Tables 1 and 2 show the results.

Example 7

The following starting materials were placed in a 2-L glass flask equipped with a thermometer, a condenser, and a stirring rod, and stirred at 80° C. for 1 hour to homogeneously dissolve the resin content, thus preparing an adhesive composition.

Kernel KJ640T
(a modified polyethylene copolymer produced by Japan Polyethylene Corporation): 110 parts
YS Polyster T130
(a terpene phenol-based tackifier produced by Yasuhara Chemical Co., Ltd.): 110 parts
MCH (methylcyclohexane): 780 parts After cooling, the solution was collected, and the solution characteristics of the obtained adhesive composition, and the adhesion of the obtained adhesive composition to a polyethylene substrate were measured as in Example 1. Tables 1 and 2 show the results.

Comparative Example 1

An adhesive composition was obtained as in Example 1, except that "Kernel KJ640T" was changed to "Rexpearl (registered trademark) ET330H" (a modified polyethylene resin produced by Japan Polyethylene Corporation, melting point: 86° C.). Table 1 shows the solution characteristics of the obtained adhesive composition. As shown in Table 1, the obtained adhesive composition was in the solidified state at room temperature (25° C.) and could not be applied to a substrate; therefore, the evaluation of the adhesion was impossible.

Comparative Example 2

An adhesive composition was obtained as in Example 1, except that "Kernel KJ640T" was changed to "Rexpearl ET720X" (a modified polyethylene resin produced by Japan Polyethylene Corporation, melting point: 98° C.). Table 1 shows the solution characteristics of the obtained adhesive composition. As shown in Table 1, the obtained adhesive composition was in the solidified state at room temperature (25° C.) and could not be applied to a substrate; therefore, the evaluation of the adhesion was impossible.

Comparative Example 3

An adhesive composition was obtained as in Example 1, except that "Kernel KJ640T" was changed to "Nucrel (registered trademark) N1560" (a modified polyethylene resin produced by Mitsui Chemicals, Inc., melting point: 95° C.). Table 1 shows the solution characteristics of the obtained adhesive composition. As shown in Table 1, the obtained adhesive composition was in the solidified state at room temperature (25° C.) and could not be applied to a substrate; therefore, the evaluation of the adhesion was impossible.

Comparative Example 4

The following starting materials were placed in a 1-L glass flask equipped with a thermometer, a condenser, and a stirring rod, and stirred at 80° C. for 1 hour to homogeneously dissolve the resin content, thus preparing an adhesive composition.

Kernel KJ640T (melting point: 58° C.)
(a modified polyethylene resin produced by Japan Polyethylene Corporation): 150 parts
MCH (methylcyclohexane): 850 parts After cooling, the solution was collected, and the solution characteristics of the obtained adhesive composition, and the adhesion of the obtained adhesive composition to a polyethylene substrate were measured as in Example 1. Tables 1 and 2 show the results.

Comparative Example 5

The following starting materials were placed in a 1-L glass flask equipped with a thermometer, a condenser, and a stirring rod, and stirred at 80° C. for 1 hour to homogeneously dissolve the resin content, thus preparing an adhesive composition.

Kernel KJ640T (melting point: 58° C.)
(a modified polyethylene resin produced by Japan Polyethylene Corporation): 100 parts
YS Polyster T130
(a terpene phenol-based tackifier produced by Yasuhara Chemical Co., Ltd.): 20 parts
MCH (methylcyclohexane): 680 parts After cooling, the solution was collected, and the solution characteristics of the obtained adhesive composition, and the adhesion of the obtained adhesive composition to a polyethylene substrate were measured as in Example 1. Tables 1 and 2 show the results.

Comparative Example 6

The following starting materials were placed in a 1-L glass flask equipped with a thermometer, a condenser, and a stirring rod, and stirred at 80° C. for 1 hour to homogeneously dissolve the resin content, thus preparing an adhesive composition.

Kernel KJ640T (melting point: 58° C.)
(a modified polyethylene resin produced by Japan Polyethylene Corporation): 100 parts
YS Polyster T130
(a terpene phenol-based tackifier produced by Yasuhara Chemical Co., Ltd.): 120 parts
MCH (methylcyclohexane): 1247 parts After cooling, the solution was collected, and the solution characteristics of the obtained adhesive composition, and the adhesion of the obtained adhesive composition to a polyethylene substrate were measured as in Example 1. Tables 1 and 2 show the results.

Comparative Example 7

An adhesive composition was obtained as in Example 1, except that the "YS Polyster T130" was changed to "YS resin SX-100" (a styrene resin produced by Yasuhara Chemical Co., Ltd.), and the solution characteristics of the obtained adhesive composition, and the adhesion of the obtained adhesive composition to a polyethylene substrate were measured as in Example 1. Tables 1 and 2 show the results.

Comparative Example 8

An adhesive composition was obtained as in Example 1, except that the "YS Polyster T130" was changed to "Hari-ester TF" (a rosin-based resin produced by Harima Chemicals Group, Inc.), and the solution characteristics of the obtained adhesive composition, and the adhesion of the obtained adhesive composition to a polyethylene substrate were measured as in Example 1. Tables 1 and 2 show the results.

Comparative Example 9

An adhesive composition was obtained as in Example 1, except that the "YS Polyster T130" was changed to "Hari-tack SE10" (a rosin-based resin produced by Harima Chemicals Group, Inc.), and the solution characteristics of the obtained adhesive composition, and the adhesion of the obtained adhesive composition to a polyethylene substrate were measured as in Example 1. Tables 1 and 2 show the results.

Comparative Example 10

An adhesive composition was obtained as in Example 1, except that the "YS Polyster T130" was changed to "Neotall (registered trademark) 125HK" (a rosin-based resin produced by Harima Chemicals Group, Inc.), and the solution characteristics of the obtained adhesive composition, and the adhesion of the obtained adhesive composition to a polyethylene substrate were measured as in Example 1. Tables 1 and 2 show the results.

Comparative Example 11

An adhesive composition was obtained as in Example 1, except that the "YS Polyster T130" was changed to "Super ester A-75" (a rosin-based resin produced by Arakawa Chemical Industries, Ltd.), and the solution characteristics of the obtained adhesive composition, and the adhesion of the obtained adhesive composition to a polyethylene substrate were measured as in Example 1. Tables 1 and 2 show the results.

Comparative Example 12

An adhesive composition was obtained as in Example 1, except that the "YS Polyster T130" was changed to "Ester gum H" (a rosin-based resin produced by Arakawa Chemical Industries, Ltd.), and the solution characteristics of the obtained adhesive composition, and the adhesion of the obtained adhesive composition to a polyethylene substrate were measured as in Example 1. Tables 1 and 2 show the results.

Comparative Example 13

An adhesive composition was obtained as in Example 1, except that the "YS Polyster T130" was changed to "Ester gum AA-L" (a rosin-based resin produced by Arakawa Chemical Industries, Ltd.), and the solution characteristics of the obtained adhesive composition, and the adhesion of the obtained adhesive composition to a polyethylene substrate were measured as in Example 1. Tables 1 and 2 show the results.

Comparative Example 14

An adhesive composition was obtained as in Example 1, except that the "YS Polyster T130" was changed to "Arkon (registered trademark) P-90" (an alicyclic saturated hydrocarbon-based resin produced by Arakawa Chemical Industries, Ltd.), and the solution characteristics of the obtained adhesive composition, and the adhesion of the obtained adhesive composition to a polyethylene substrate were measured as in Example 1. Tables 1 and 2 show the results.

Comparative Example 15

An adhesive composition was obtained as in Example 1, except that the "YS Polyster T130" was changed to "Arkon M-90" (an alicyclic saturated hydrocarbon-based resin produced by Arakawa Chemical Industries, Ltd.), and the solution characteristics of the obtained adhesive composition, and the adhesion of the obtained adhesive composition to a polyethylene substrate were measured as in Example 1. Tables 1 and 2 show the results.

Comparative Example 16

An adhesive composition was obtained as in Example 1, except that the "YS Polyster T130" was changed to "Pine-crystal (registered trademark) KR-50M" (a rosin metal salt-based resin produced by Arakawa Chemical Industries, Ltd.), and the solution characteristics of the obtained adhesive composition, and the adhesion of the obtained adhesive composition to a polyethylene substrate were measured as in Example 1. Tables 1 and 2 show the results.

As is clear from Tables 1 and 2, according to the present invention, it is possible to obtain adhesive compositions with excellent stability at low temperatures and excellent adhesion to both low density polyethylene (LDPE) substrates and high density polyethylene (HDPE) substrates.

Comparative Examples 1 to 3 serve as examples in which the modified polyethylene copolymer (component A) had a melting point of more than 80° C., Comparative Examples 4 to 6 serve as examples in which the amount of component B was outside the range of 30 to 100 parts by weight, per 100 parts by weight of component A, and Comparative Examples 7 to 16 serve as examples in which a tackifier other than those of terpene-based tackifiers was used as component B.

TABLE 1

Adhesive resin component

| Ex./Comp. Ex. | Modified polyethylene copolymer (component A); melting point (° C.) | Tackifier (component B) | Organic solvent (component C) | Polypropylene-based resin (component D) | Composition weight ratio Component A/Component B/Component C/Component D | Weight ratio Component A + Component B + Component D wt % |
|---|---|---|---|---|---|---|
| Ex-1 | Kernel KJ640T: 58° C. | YS Polyster T130 | MCH | None | 10/5/85/0 | 15 |
| Ex-2 | Rexpearl ET350X: 73° C. | YS Polyster T130 | Toluene | None | 10/7/96/0 | 15 |
| Ex-3 | Kernel KJ640T: 58° C. | YS Polyster T130 | MCH | None | 10/4/79/0 | 15 |
| Ex-4 | Kernel KJ640T: 58° C. | YS Polyster T130 | CH/ethyl acetate = 90/10 | Hardlen DX-526P | 9/5/85/1 | 15 |
| Ex-5 | Kernel KJ640T: 58° C. | YS Polyster T130 | CH/ethyl acetate = 90/10 | L-Modu S400 | 9/5/85/1 | 15 |
| Ex-6 | Kernel KJ640T: 58° C. | Clearon K100 | CH/ethyl acetate = 90/10 | Hardlen DX-526P | 9/5/85/1 | 15 |
| Ex-7 | Kernel KJ640T: 58° C. | YS Polyster T130 | MCH | None | 10/8/64/0 | 22 |
| Comp. Ex-1 | Rexpearl ET330H: 86° C. | YS Polyster T130 | MCH | None | 10/5/85/0 | 15 |
| Comp. Ex-2 | Rexpearl ET720X: 98° C. | YS Polyster T130 | MCH | None | 10/5/85/0 | 15 |
| Comp. Ex-3 | Nucrel N1560: 90° C. | YS Polyster T130 | MCH | None | 10/5/85/0 | 15 |
| Comp. Ex-4 | Kernel KJ640T: 58° C. | None | MCH | None | 15/0/85/0 | 15 |
| Comp. Ex-5 | Kernel KJ640T. 58° C. | YS Polyster T130 | MCH | None | 10/2/68/0 | 15 |
| Comp. Ex-6 | Kernel KJ640T: 58° C. | YS Polyster T130 | MCH | None | 10/12/125/0 | 15 |
| Comp. Ex-7 | Kernel KJ640T: 58° C. | YS resin SX-100 | MCH | None | 10/5/85/0 | 15 |
| Comp. Ex-8 | Kernel KJ640T: 58° C. | Hariester TF | MCH | None | 10/5/85/0 | 15 |
| Comp. Ex-9 | Kernel KJ640T: 58° C. | Haritack SE10 | MCH | None | 10/5/85/0 | 15 |
| Comp. Ex-10 | Kernel KJ640T: 58° C. | Neotall 125HK | MCH | None | 10/5/85/0 | 15 |
| Comp. Ex-11 | Kernel KJ640T: 58° C. | Super ester A-75 | MCH | None | 10/5/85/0 | 15 |
| Comp. Ex-12 | Kernel KJ640T: 58° C. | Ester gum H | MCH | None | 10/5/85/0 | 15 |
| Comp. Ex-13 | Kernel KJ640T: 58° C. | Ester gum AA-L | MCH | None | 10/5/85/0 | 15 |
| Comp. Ex-14 | Kernel KJ640T: 58° C. | Arkon P-90 | MCH | None | 10/5/85/0 | 15 |
| Comp. Ex-15 | Kernel KJ640T: 58° C. | Arkon M-90 | MCH | None | 10/5/85/0 | 15 |
| Comp. Ex-16 | Kernel KJ640T: 58° C. | Pinecrystal KR-50M | MCH | None | 10/5/85/0 | 15 |

TABLE 2

Evaluation criteria

| Ex./Comp. Ex. | Solution viscosity at 25° C. (mPa/s) | Solution storage stability 20° C. | Solution storage stability 15° C. | HDPE film Cross-cut peel test | LDPE film Cross-cut peel test | LDPE film 90° peel strength (N/cm) |
|---|---|---|---|---|---|---|
| Ex-1 | 157 | A | B | 100/100 | 100/100 | 3.0 |
| Ex-2 | 97 | A | B | 100/100 | 100/100 | 2.8 |
| Ex-3 | 158 | A | B | 95/100 | 100/100 | 3.2 |
| Ex-4 | 128 | A | A | 100/100 | 95/100 | 2.5 |
| Ex-5 | 121 | A | A | 100/100 | 90/100 | 2.4 |
| Ex-6 | 104 | A | A | 70/100 | 100/100 | 2.6 |
| Ex-7 | 267 | A | B | 100/100 | 70/100 | 2.0 |
| Comp. Ex-1 | Unmeasurable | C | C | Unmeasurable | Unmeasurable | Unmeasurable |
| Comp. Ex-2 | Unmeasurable | C | C | Unmeasurable | Unmeasurable | Unmeasurable |
| Comp. Ex-3 | Unmeasurable | C | C | Unmeasurable | Unmeasurable | Unmeasurable |
| Comp. Ex-4 | 986 | B | C | 20/100 | 100/100 | 3.9 |
| Comp. Ex-5 | 348 | A | C | 35/100 | 98/100 | 3.4 |
| Comp. Ex-6 | 47 | A | A | 10/100 | 15/100 | 0.5 |
| Comp. Ex-7 | 134 | A | A | 0/100 | 100/100 | 1.8 |
| Comp. Ex-8 | 176 | A | C | 10/100 | 100/100 | 2.2 |
| Comp. Ex-9 | 170 | A | B | 0/100 | 100/100 | 2.6 |
| Comp. Ex-13 | 176 | A | C | 0/100 | 25/100 | 0.8 |
| Comp. Ex-11 | 171 | A | C | 0/100 | 100/100 | 2.4 |
| Comp. Ex-12 | 167 | A | B | 0/100 | 100/100 | 2.2 |
| Comp. Ex-13 | 138 | A | B | 0/100 | 100/100 | 2.2 |
| Comp. Ex-14 | 163 | A | B | 0/100 | 100/100 | 3.0 |
| Comp. Ex-15 | 132 | A | B | 0/100 | 90/100 | 1.9 |
| Comp. Ex-16 | 178 | A | C | 0/100 | 40/100 | 1.2 |

INDUSTRIAL APPLICABILITY

The adhesive composition according to the present invention has excellent storage stability at low temperatures and excellent adhesion to polyolefin-based resin substrates, in particular, polyethylene-based resin substrates, and is useful for the application of a primer, a coating composition, an ink, a coating agent, and an adhesive for painting, printing, gluing, or coating with respect to these substrates.

The invention claimed is:

1. An adhesive composition comprising:
    a modified polyethylene copolymer (component A) having a melting point of less than 80° C.;
    a terpene-based tackifier (component B); and
    an organic solvent (component C),
    wherein component A is at least one member selected from the group consisting of an ethylene-α-olefin copolymer, an ethylene-acrylic acid copolymer, an ethylene-acrylic acid alkyl ester copolymer, an ethylene-α,β-unsaturated carboxylic acid copolymer, and an ethylene-α,β-unsaturated carboxylic acid anhydride copolymer, and
    wherein component B is contained in an amount of 30 to 100 parts by weight, per 100 parts by weight of component A.

2. The adhesive composition according to claim 1, wherein the terpene-based tackifier (component B) is a terpene phenol resin.

3. The adhesive composition according to claim 1, wherein the organic solvent (component C) is an alicyclic hydrocarbon compound and/or an aromatic hydrocarbon compound.

4. The adhesive composition according to claim 1, wherein the weight percentage of component A and component B is 20 wt % or less, based on the total weight of component A, component B, and component C.

5. The adhesive composition according to claim 1, further comprising a polypropylene-based resin (component D) in an amount of less than 15 parts by weight, per 100 parts by weight of component A.

6. The adhesive composition according to claim 2, wherein the organic solvent (component C) is an alicyclic hydrocarbon compound and/or an aromatic hydrocarbon compound.

7. The adhesive composition according to claim 2, wherein the weight percentage of component A and component B is 20 wt % or less, based on the total weight of component A, component B, and component C.

8. The adhesive composition according to claim 3, wherein the weight percentage of component A and component B is 20 wt % or less, based on the total weight of component A, component B, and component C.

9. The adhesive composition according to claim 6, wherein the weight percentage of component A and component B is 20 wt % or less, based on the total weight of component A, component B, and component C.

10. The adhesive composition according to claim 2, further comprising a polypropylene-based resin (component D) in an amount of less than 15 parts by weight, per 100 parts by weight of component A.

11. The adhesive composition according to claim 3, further comprising a polypropylene-based resin (component D) in an amount of less than 15 parts by weight, per 100 parts by weight of component A.

12. The adhesive composition according to claim 6, further comprising a polypropylene-based resin (component D) in an amount of less than 15 parts by weight, per 100 parts by weight of component A.

* * * * *